(No Model.)
J. BULGER.
CONVEYER.
No. 529,159. Patented Nov. 13, 1894.
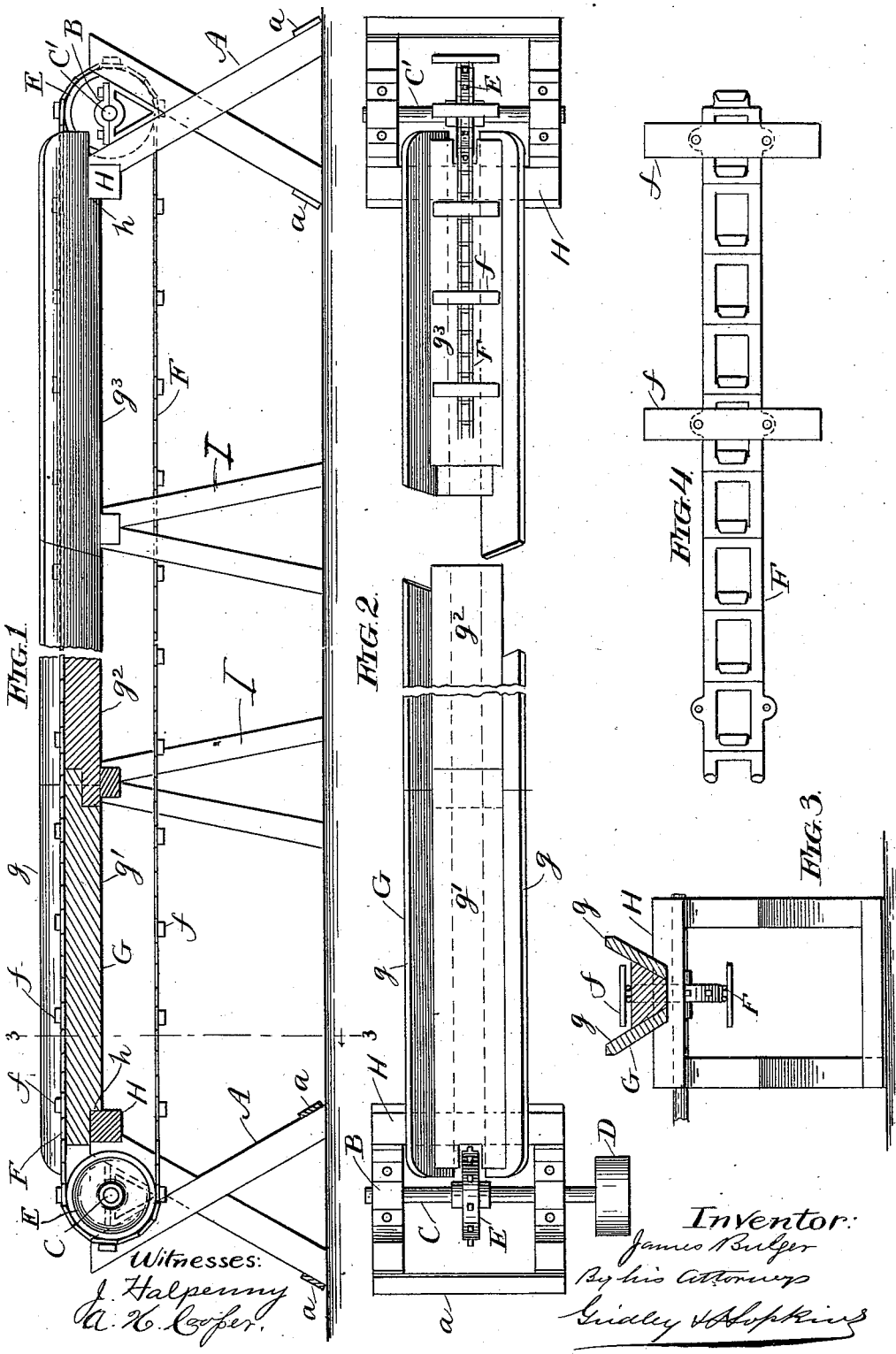

UNITED STATES PATENT OFFICE.

JAMES BULGER, OF CHICAGO, ILLINOIS.

CONVEYER.

SPECIFICATION forming part of Letters Patent No. 529,159, dated November 13, 1894.

Application filed January 12, 1894. Serial No. 496,603. (No model.)

*To all whom it may concern:*

Be it known that I, JAMES BULGER, a citizen of the United States, residing at Chicago, in the county of Cook and State of Illinois, have invented certain new and useful Improvements in Conveyers, of which the following is a specification.

The present invention relates more especially to that class of conveyers which are arranged in other than vertical position for conveying articles or material of some sort from one point to another.

I am of course aware that it is not new to construct a conveyer of two wheels or pulleys around which passes an endless carrier, the said wheels or pulleys being journaled to fixed supports, such conveyers being common and extensively used in saw-mills for conveying logs from a pile or dock to the saw.

One object of the present invention is to provide a conveyer of such construction that the length of the carrier may be adjusted, and another object of the invention is to provide a conveyer of such construction that it can be moved about from place to place, and to these ends the invention consists in the features of novelty that are particularly pointed out in the claims hereinafter.

In the accompanying drawings, which are made a part of this specification:—Figure 1 is a view of a conveyer embodying the invention, one end of said conveyer being shown in side elevation, and the other in vertical longitudinal section. Fig. 2 is a plan view of some of the parts thereof. Fig. 3 is a vertical transverse section on the line 3—3, Fig. 1. Fig. 4 is a detail view showing a portion of the endless carrier.

A, A represent a pair of supports or trestles, which may be of any desired construction so long as they are portable. In the drawings each of them is shown as consisting of four pieces of timber arranged in the form of two Xs placed side by side and secured together by cross-ties $a$. I desire to have it understood, however, that the invention is not limited to supports of any particular construction, but comprehends supports of any construction provided they are capable of being easily moved from place to place. Secured to each of these supports are journal boxes B in which are journaled shafts C, C', the former of which is provided with a pulley D adapted to receive a belt for driving it. Secured to these shafts are sprocket wheels E, and embracing these sprocket wheels is a sprocket chain F (constituting the carrier), of such construction that its links may be separated from each other so that the chain may be made of any desired length by simply inserting or removing the necessary number of links.

It will be seen that unless some means be employed to prevent it, where the supports of the sprocket wheels are movable, the traction of the chain will draw them toward each other and upset them. To prevent this I arrange between the supports a strut or brace G, the opposite ends of which engage the supports in such manner that their movement toward each other is resisted. As shown in the drawings, this engagement is effected by providing the supports with cross-beams H, upon which the ends of the strut rest, and providing the strut itself with shoulders $h$ which bear against the cross-beams. In addition to this function, the brace also serves as a means for supporting the upper lap of the endless chain or carrier and causing it to lie and travel in a straight line between the upper peripheries of the wheels.

In the drawings I have shown the invention embodied in a conveyer of the character required for conveying logs, and when the conveyor is used for this or a similar purpose, the brace or strut may be made to perform the still further function of preventing the logs from rolling off of the carrier. This is accomplished by providing the strut with side boards or flanges $g$, which project above the carrier and between which the carrier travels. The carrier itself, when used for this purpose is provided with cross-pieces $f$ bolted to the links and located close enough together to enable a log to span the distance between two of them. I prefer to construct this brace or strut, as shown in Fig. 3, of a central part or beam, which is flat on top and has sides which slope downward and toward each other, and the two side boards $g$ secured to this central piece or beam and projecting above it, as described. I prefer, also, to construct this brace or strut of a number of sections $g'$, $g^2$, $g^3$, &c., having abutting ends, and to arrange below each of the joints thus formed a suitable support or trestle I, and I prefer to provide the meeting ends of the several sections with complementary tongues and grooves, as shown more clearly in Fig 2, so constructed that the parts are separable from each other only by an endwise movement of one relatively to the other, and so that they are not capable of relative lateral movement. I desire to have it understood, however, that this particular form of joint, or a joint of this particular nature, is not indispensable, and that a simple lap-joint or scarf (such as is shown in Fig. 1 between the parts $g'$ and $g^2$) may be used. This joint is sufficient, because when the machine is at work the weight of the load and the carrier coming upon the top of the several sections of the strut will effectually prevent upward deflection at the joints, and there will be no material tendency to horizontal deflection.

The object in making the strut in a number of sections is to enable the use of more or less of said sections, and thereby produce a strut of greater or less length.

In order to prevent the logs from bumping upon the sprocket wheel at the delivery end of the conveyer, the strut G is bifurcated, forming tongues which project alongside of the wheel, and support the carrier until it reaches the wheel and the log is in position to be discharged.

A conveyer constructed as above described is portable in its nature and adjustable in length, so that it may be placed wherever needed, and, by using the necessary number of links and brace-sections, may be made of the necessary length.

What I claim as new, and desire to secure by Letters Patent, is—

1. In a conveyer, the combination of portable supports, wheels carried thereby, an endless carrier embracing said wheels, said carrier comprising a number of separable links of such construction that any desired number of them may be inserted in or removed from the carrier for the purpose of making it of the desired length, a strut arranged between and engaging said supports, said strut being constructed of a number of separable sections the meeting ends of which are provided with complementary tongues and grooves for preventing the lateral movement of one section relatively to the other, and portable supports arranged beneath the joints of the strut the construction being such that the several sections of the strut may be readily separated for changing the position of the conveyer, substantially as set forth.

2. In a conveyer, the combination of portable supports, wheels supported thereby, an endless carrier embracing said wheels, said carrier comprising a number of separable links of such construction that any desired number of them may be inserted in or removed from the carrier for the purpose of making it of the desired length, a strut arranged between the supports and having shoulders engaging them for preventing their relative movement toward each other, said strut and supports being otherwise unsecured to each other, said strut being formed of a number of separable sections placed end to end and being unsecured to each other, and portable supports arranged beneath the joints of the strut, substantially as set forth.

JAMES BULGER.

Witnesses:
J. HALPENNY,
L. M. HOPKINS.